United States Patent
Jung et al.

(10) Patent No.: US 11,498,578 B2
(45) Date of Patent: Nov. 15, 2022

(54) METHOD AND DRIVE SYSTEM FOR ESTIMATING CARDAN SHAFT MOMENTS IN DRIVE TRAINS

(71) Applicant: Dr. Ing. h.c. F. Porsche Aktiengesellschaft, Stuttgart (DE)

(72) Inventors: Hong Truc Jung, Leonberg (DE); Tobias Roulet, Altdorf (DE); Leonie Christin Freisinger, Buehlerzell (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 170 days.

(21) Appl. No.: 17/102,642

(22) Filed: Nov. 24, 2020

(65) Prior Publication Data

US 2021/0163019 A1 Jun. 3, 2021

(30) Foreign Application Priority Data

Nov. 29, 2019 (DE) ...................... 10 2019 132 437.8

(51) Int. Cl.
*G06F 19/00* (2018.01)
*B60W 50/00* (2006.01)
*B60W 10/06* (2006.01)

(52) U.S. Cl.
CPC ........ *B60W 50/0097* (2013.01); *B60W 10/06* (2013.01); *B60W 2510/0283* (2013.01); *B60W 2510/0638* (2013.01); *B60W 2510/0657* (2013.01); *B60W 2710/0666* (2013.01)

(58) Field of Classification Search
CPC ...... B60W 10/06; B60W 20/10; B60W 20/40; Y02T 10/40; F02D 19/025; F02D 19/0623; F02D 41/266; F02D 2041/1418
See application file for complete search history.

(56) References Cited

U.S. PATENT DOCUMENTS

| 7,116,068 | B2 | 10/2006 | Boesch et al. |
| 10,358,140 | B2 | 7/2019 | Livshiz et al. |
| 11,251,742 | B2 * | 2/2022 | Al-Hokayem ........ B60W 10/08 |

(Continued)

FOREIGN PATENT DOCUMENTS

| DE | 102011084844 A1 | 4/2013 |
| DE | 102018123818 A1 | 4/2019 |
| EP | 2451686 B1 | 5/2013 |

*Primary Examiner* — John Kwon
(74) *Attorney, Agent, or Firm* — Leydig, Voit & Mayer, Ltd.

(57) ABSTRACT

A method for estimating cardan shaft moments in a vehicle includes performing a state space modelling of a physical model for force transmission in at least one drive train The at least one drive train is formed with at least one drive machine, at least one axle and at least two axle shafts each with a respective wheel. The method further includes selecting the physical model as a torsional oscillator chain in which a respective drive machine inertia moment is assigned to the respective drive train and a respective wheel inertia moment is assigned to the respective wheel. The respective drive machine inertia moment is connected by a respective spring-damper element to the respective wheel inertia moment of the respective wheel which is connected to the respective axle shaft. A vehicle mass is connected by a respective spring-damper element to the respective wheel inertia moment of the respective wheel.

10 Claims, 2 Drawing Sheets

(56) References Cited

U.S. PATENT DOCUMENTS

| | | | |
|---|---|---|---|
| 2009/0085309 A1* | 4/2009 | Hirao | B60G 17/015 |
| | | | 280/5.503 |
| 2014/0207349 A1 | 7/2014 | Christ et al. | |
| 2021/0188252 A1* | 6/2021 | Lu | B60W 40/12 |
| 2021/0213935 A1* | 7/2021 | Lu | B60W 10/18 |

* cited by examiner

METHOD AND DRIVE SYSTEM FOR ESTIMATING CARDAN SHAFT MOMENTS IN DRIVE TRAINS

CROSS-REFERENCE TO PRIOR APPLICATIONS

Priority is claimed to German Patent Application No. DE 10 2019 132 437.8, filed on Nov. 29, 2019, the entire disclosure of which is hereby incorporated by reference herein.

FIELD

The present disclosure is directed to a method for estimating cardan shaft moments in at least one drive train which guides a force transmission between an engine, axle shafts and wheels, and furthermore, to a drive system with this estimation of cardan shaft moments.

BACKGROUND

A respective axle shaft in the drive train of the vehicle transmits a moment generated by at least one drive unit to the wheels, and is thus directly involved in vehicle acceleration. Also, braking moments or road surface unevenness act on the axle shafts via the wheels. The axle shafts are thus often exposed to high loads. In order to describe such loads, it is helpful to represent a respective force transmission system on a respective physical model, and calculate this with analytical and/or numerical mathematical methods.

Thus publication DE 10 2011 084 844 A1 determines in approximate fashion the torque actually transmitted by a clutch of a drive train on the basis of a state space model using a Kalman filter. In the hybrid drive train considered, with an internal combustion engine and an electrical machine on one axle, this allows improved engagement of the clutch.

Publication DE 10 2018 123 818 A1 proposes an optimum controller, which for example regulates the vehicle acceleration and hence minimizes fuel consumption. A conventional drive train with one drive unit here serves for the model-predictive control system.

US publication U.S. Pat. No. 7,116,068 B2 proposes a diagnostic system and a method for an electric motor, wherein torque estimates are used. For this, anomalies in the electric motor are diagnosed by means of current sensors.

European publication EP 2 451 686 B1 describes a method for controlling the gearbox output moment, which follows the driver's request moment and at the same time reduces drive train oscillations. The system studied, with one drive unit and one drive train with two wheels, has a total of four states.

A respective cardan shaft moment in the axle shafts can indeed be detected with measurement technology specially designed for this, but the measurement technology designed in this way is very complex and cost-intensive and not suitable for series production. Even test vehicles are not usually equipped therewith. A further possibility would be to simulate the respective driving maneuvers in off-line simulations and calculate the respective cardan shaft moments for these. However, this has the decisive disadvantage that the axle shaft torques calculated in this way are not available in real time during travel.

SUMMARY

In an embodiment, the present invention provides a method for estimating cardan shaft moments in a vehicle. The method includes performing a state space modelling of a physical model for force transmission in at least one drive train The at least one drive train is formed with at least one drive machine, at least one axle and at least two axle shafts each with a respective wheel. The method further includes selecting the physical model as a torsional oscillator chain in which a respective drive machine inertia moment is assigned to the respective drive train and a respective wheel inertia moment is assigned to the respective wheel. The respective drive machine inertia moment is connected by a respective spring-damper element to the respective wheel inertia moment of the respective wheel which is connected to the respective axle shaft. A vehicle mass is connected by a respective spring-damper element via a respective tire radius to the respective wheel inertia moment of the respective wheel. A movement equation system is provided for the torsional oscillator chain by means of the principle of angular momentum. The method further includes providing, in real time, measurement signals of a respective drive moment of the respective drive machine, a respective angular speed of the respective drive machine, a respective braking moment at the respective wheel, and a respective angular speed of the respective wheel. The method additionally includes estimating, in real time via a Kalman filter, a respective axle shaft torque assigned to the respective axle shaft, and reducing, in real time in response to a predefined load limit of the respective axle shaft torque being exceeded, the respective drive moment of the respective drive machine.

BRIEF DESCRIPTION OF DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
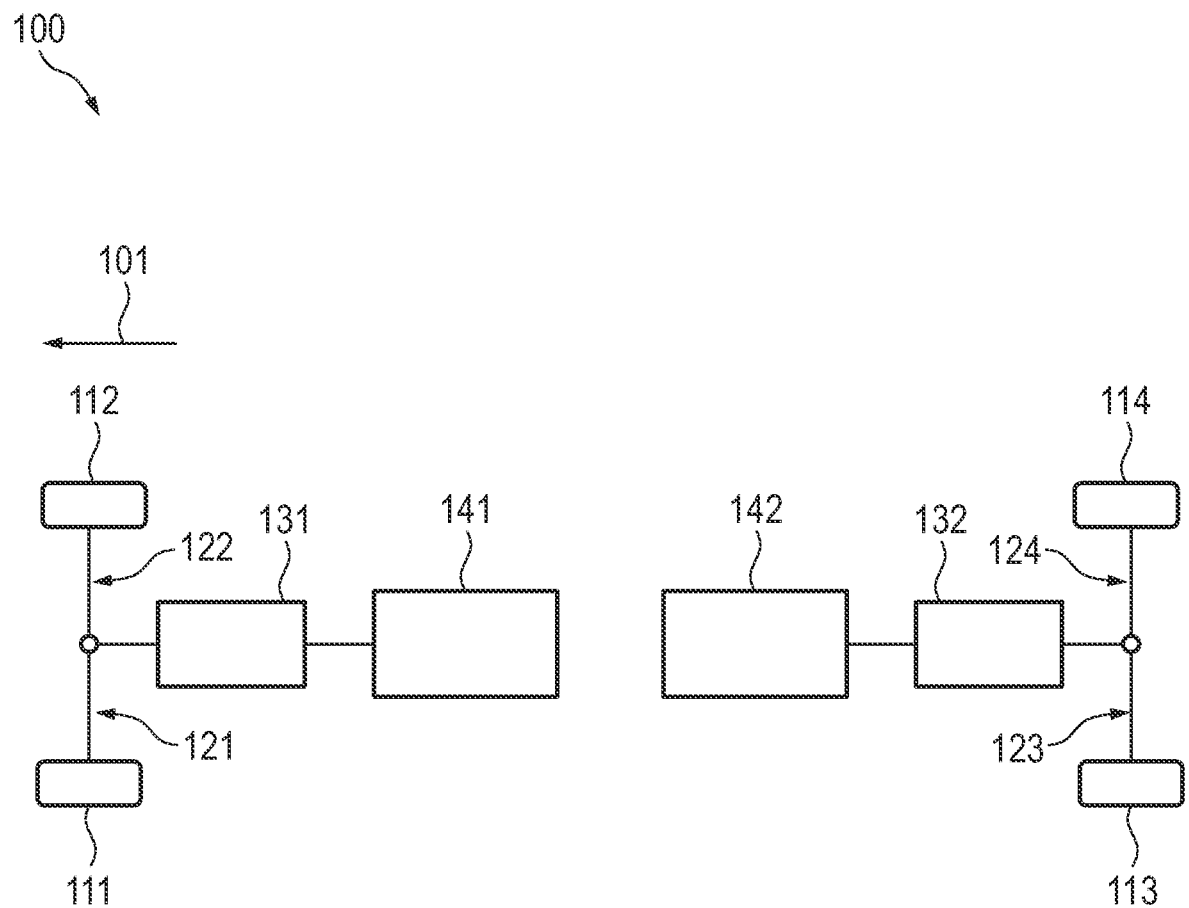
FIG. 1 shows an electrified all-wheel-drive system according to the prior art.

In an embodiment, the present invention provides a method for estimating cardan shaft moments in drive trains which in particular takes into account axle shafts. The estimation of moments serves to detect a load on components in the total force transmission path between the respective engine and respective wheels in real time, in order thus at least to be able to absorb high loads instantaneously. Furthermore, a drive system with this estimation of cardan shaft moments is proposed.

To achieve the above-mentioned object, a method is proposed for estimating cardan shaft moments in a vehicle, wherein a state space modeling of a physical model for force transmission in at least one drive train is performed. The at least one drive train is formed with at least one drive machine, at least one axle and at least two axle shafts or cardan shafts each with a respective wheel. The physical model is selected as a torsional oscillator chain in which a respective drive machine inertia moment is assigned to the respective drive machine and a respective wheel inertia moment is assigned to a respective wheel. The respective drive machine inertia moment is connected by a respective spring-damper element to the respective wheel inertia moment of the respective wheel which is connected to the respective axle shaft. A vehicle mass is connected by a respective spring-damper element via a respective tire radius to the respective wheel inertia moment of the respective wheel. A movement equation system is provided for the torsional oscillator chain by means of the principle of angular momentum. Measurement signals of a respective drive moment of the respective drive machine, a respective angular speed of the respective drive machine, a respective braking moment at the respective wheel, and a respective angular speed of the respective wheel are provided in real time. By means of a Kalman filter, a respective axle shaft torque assigned to the respective axle shaft is estimated in real time, wherein when a predefined load limit of the respective axle shaft torque is exceeded, the respective drive moment of the respective drive machine is reduced in real time.

The method according to the invention considers a rotational dynamic in a respective drive train, and by estimating the respective axle shaft torques acting in the respective axle shafts, advantageously allows a protective function. Firstly, in this way a load statistic of the respective axle shafts may be produced, and secondly the respective components arranged in the respective drive train may be designed with respect to loads estimated by the method according to the invention.

The physical model considered here of the respective drive train, together with the error-loaded measurement signals, constitutes a linear stochastic system, for the numerical solution of which the Kalman filter is used as a Bayes minimum variance estimator or optimum filter. The method according to the invention thus advantageously provides estimated values of the respective left and right axle shaft torques $T_{SW,L}$ and $T_{SW,R}$, e.g. $T_{SW,VL}$ and $T_{SW,VR}$ for a front axle (VA) and $T_{SW,HL}$ and $T_{SW,HR}$ for a rear axle (HA), knowledge of which allows components in the drive train to be designed more precisely for the actual loads occurring. Here, the abbreviation SW stands for axle shaft, L for left, R for right, VL for front left, VR for front right, HL for rear left, and HR for rear right. In addition, according to the invention, the components can be protected from excessive loads by reducing the respective drive moments. Such high loads may occur for example on a so-called "misuse kick-down" maneuver. The method according to the invention now allows the respective axle shaft torques to be calculated in real time and made available to a control unit influencing a respective drive moment, e.g. a power controller of a respective drive machine, in order to reduce the respective drive moment.

The physical model of force transmission in the respective drive train, produced as a torsional oscillator chain, has at least three inertia moments J, namely a drive machine inertia moment $J_{EM}$ e.g. from an electrical drive machine, and two wheel inertia moments $J_{Rad,L}$, $J_{Rad,R}$ of a left and right wheel respectively. In the case of two drive trains, e.g. for front and rear axles, and one respective assigned drive machine, the torsional oscillator chain has two drive machine inertia moments $J_{EM,VA}$, $J_{EM,VA}$ and a total of four wheel inertia moments $J_{Rad,VL}$, $J_{Rad,VR}$, $J_{Rad,HL}$, $J_{Rad,HR}$ (see also FIG. 2 for this example).

According to the invention, the Kalman filter uses measurement signals available in real time for a respective drive moment $T_{EM}$ and a respective angular speed $\omega_{EM}$ of a respective electrical machine, e.g. from an electrical machine (EM) driving the front axle with a drive moment $T_{EM,VA}$ and angular speed $\omega_{EM,VA}$, and from an electrical machine driving the rear axle with a drive moment $T_{EM,HA}$ and angular speed $\omega_{EM,HA}$. Furthermore, there are respective braking moments $T_{B,L}$, $T_{B,R}$ and angular speeds $\omega_{Rad,L}$, $\omega_{Rad,R}$ of the respective left and right wheel, e.g. $T_{B,VL}$, $T_{B,VR}$ and $\omega_{Rad,VL}$, $\omega_{Rad,VR}$ for wheels on the front axle and $T_{B,HL}$, $T_{B,HR}$ and $\omega_{Rad,HL}$, $\omega_{Rad,HR}$ for wheels on the rear axle.

In one embodiment of the method according to the invention, a respective rotational degree of freedom is assigned to the respective drive machine inertia moments and the respective wheel inertia moments, and a longitudinal degree of freedom is assigned to the vehicle mass. The respective rotational degree of freedom is described by a respective angle $\varphi$ and/or a respective angular speed $\omega$, and the longitudinal degree of freedom is described by a travel s and/or a speed v. In the above-mentioned example of two drive trains with six inertia moments $J_{EM,VA}$, $J_{EM,VA}$, $J_{Rad,VL}$, $J_{Rad,VR}$, $J_{Rad,HL}$, $J_{Rad,HR}$, this gives a seventh degree of freedom via the vehicle mass m which is represented via the respective tire radii $r_{VL}$, $r_{VR}$, $r_{HL}$, $r_{HR}$. The six inertia moments and the vehicle mass are connected together by the respective spring-damper elements and together represent seven degrees of freedom of a state space for the example of two drive trains. Here, the six inertia moments can move rotationally with respective angles $\varphi_{EM,VA}$, $\varphi_{EM,HA}$, $\varphi_{Rad,VL}$, $\varphi_{Rad,VR}$, $\varphi_{Rad,HL}$, $\varphi_{Rad,HR}$ or angular speeds $\omega_{EM,VA}$, $\omega_{EM,HA}$, $\omega_{Rad,VL}$, $\omega_{Rad,VR}$, $\omega_{Rad,HL}$, $\omega_{Rad,HR}$, and the vehicle mass can move longitudinally with travel s or speed v.

In a refined embodiment of the method according to the invention, a state vector x is formed with the respective angle $\varphi_{EM}$ and angular speed $\omega_{EM}$ of the respective drive machine, with the respective angle $\varphi_{Rad,L}$, $\varphi_{Rad,R}$ and respective angular speed $\omega_{Rad,L}$, $\omega_{Rad,R}$ of the respective wheels, with travel s and speed v of the vehicle. A system input vector u is formed with the respective drive moment $T_{EM}$ of the respective drive machine and with the respective braking moment $T_{B,L}$, $T_{B,R}$ of the respective wheels. The movement equations in vectorial form are transferred into a state space with a system matrix A which is filled with respective spring values and respective damping values of the respective spring-damper elements and with respective inertia moments of the mass of the respective degrees of freedom, an input matrix B which is filled with values of the respective drive machine inertia moments and respective wheel inertia moment and the mass, and an output matrix C, which describe respective measurable states in the respective drive train. The Kalman filter in a prediction step $x_{k_-}$ estimates a model prediction $Cx_{k_-}$ and from this in a correction step calculates a future system state. From the difference between the model prediction $Cx_{k_-}$ and measurement signals $z_k$, a model error is calculated, weighted or multiplied by a predefined steady-state Kalman amplification K and added to the estimated prediction step $x_{k_-}$. From such a corrected future system state $x_k$, then the estimation of axle shaft torques is obtained.

The method according to the invention advantageously combines information on the physical model of the drive trains of the vehicle with measurements which can be performed in real time, and hence with measurement signals of variables of the physical model which are available in real time. Furthermore, the use of the Kalman filter as a numerical method is advantageous: this again allows processing of the measurement signals on the basis of the physical model in real time.

For the above-mentioned example of two drive trains, the result is a 14-dimensional state vector $x=[\varphi_{EM,VA}, \varphi_{EM,HA}, \varphi_{Rad,VL}, \varphi_{Rad,VR}, \varphi_{Rad,HL}, \varphi_{Rad,HR}, S, \omega_{EM,VA}, \omega_{EM,HA}, \omega_{Rad,VL}, \omega_{Rad,VR}, \omega_{Rad,HL}, \omega_{Rad,HR}, v]^T$ and a 6-dimensional system input vector $u=[T_{EM,VA}, T_{EM,HA}, T_{B,VL}, T_{B,VR}, T_{B,HL}, T_{B,HR}]^T$. After transferring the movement equations in vectorial form into the state space with system matrices A, B, C, according to "Kalman, R. E.: A New Approach to Linear Filtering and Prediction Problems. Transaction of the ASME, Journal of Basic Engineering. 1960, p. 35-45", the future system state $x_{k-}$ can be calculated in advance with the prediction step $$x_{k-}=Ax_{k-1}+Bu_{k-1} \qquad (1)$$

In a further step, the pre-estimate in equation 1 is now corrected. For this, for the above-mentioned example, the measurement signals $z_k=[\omega_{EM,VA,mess}, \omega_{EM,HA,mess}, \omega_{Rad,VL,mess}, \omega_{Rad,VR,mess}, \omega_{Rad,HL,mess}, \omega_{Rad,HR,mess}]^T$ are compared with the model prediction $$Cx_{k-}=[\omega_{EM,VA,model}, \omega_{EM,HA,model}, \omega_{Rad,VL,model}, \omega_{Rad,VR,model}, \omega_{Rad,HL,model}, \omega_{Rad,HR,model}]^T \qquad (2).$$

This comparison, formed approximately as the difference $(z_k-Cx_k)$, corresponds to the model error. It is weighted with the steady-state Kalman amplification K calculated previously, i.e. not in real time.

The steady-state Kalman amplification K takes into account freely selectable parameters in design matrices Q and R. Here, Q is a quadratic matrix and for the above-mentioned example has a dimension of 14×14, corresponding to the 14-dimensional state vector x. Q describes uncertainties in the movement equations. R is also a quadratic matrix and has a dimension of 6×6, corresponding to the six measurable states from $z_k$. R describes uncertainties in the measurements. In order now to calculate the steady-state Kalman amplification K, firstly a steady-state error co-variance matrix $P_{st}$ is calculated by solving a so-called Riccati equation $$P_{st-}=A \, P_{st}A^T-A \, P_{st}C^T(C \, P_{st}C^T+R)^{-1}(C \, P_{st}A)^T+Q \qquad (3)$$

This then gives the steady-state Kalman amplification K as $$K=P_{st}C^T(C \, P_{st}C^T+R)^{-1} \qquad (4)$$

By adjusting the parameters in the matrices A, B, C, K, Q, R, the estimation of axle shaft torques can be adapted to individual vehicles.

In a further embodiment of the method according to the invention, the respective drive machine inertia moment is connected via a respective gear translation ratio to the respective spring-damper element of the respective axle shaft. A respective gear ratio signal for a respective gear translation ratio of the respective axle is provided in real time. The movement equation system obtained for the torsional oscillator chain by means of the principle of angular momentum is provided for the respective gear translation ratio. According to the invention, thus in addition a respective gear ratio signal iA in a respective drive train is made available for the Kalman filter, e.g. the gear ratio signals iVA, iHA for front and rear axles.

In yet a further embodiment of the method according to the invention, the method is applied to a drive axle with two axle shafts. The system concerned thus corresponds to 2WD, i.e. in total two wheels of the vehicle are driven.

In a further refined embodiment of the method according to the invention, the method is applied to a drive axle with four axle shafts. The system concerned thus corresponds to 4WD, i.e. in total four wheels of the vehicle are driven.

In yet a further refined embodiment of the method according to the invention, the method is applied to two drive axles each with two axle shafts. The system concerned thus corresponds to 4WD, i.e. in total four wheels of the vehicle are driven.

In yet a further refined embodiment of the method according to the invention, in addition to the measurement signals, a respective distribution variable of the respective controlled transverse differential lock is provided. This measurement signal is also supplied to the Kalman filter.

Furthermore, a drive system for estimation of cardan shaft torques in a vehicle is claimed. The drive system comprises at least one drive train provided with respective measurement sensors, with at least one drive machine, at least one axle and at least two axle shafts each with a respective wheel and a respective brake. The drive system is configured to provide in real time measurement signals of a respective drive moment of the respective drive machine, a respective angular speed of the respective drive machine, a respective braking moment at the respective wheel, and a respective angular speed of the respective wheel. Via the drive system, a physical model is formed in which a respective drive machine inertia moment is assigned to the respective drive machine, and a respective wheel inertia moment is assigned to the respective wheel, wherein the respective drive machine inertia moment is connected by a respective spring-damper element to the respective wheel inertia moment of the respective wheel which is connected to the respective axle shaft, wherein a vehicle mass is connected by a respective spring-damper element via a respective tire radius to the respective wheel inertia moment of the respective wheel. The physical model is described by a torsional oscillator chain, wherein a movement equation system is provided for the torsional oscillator chain by means of the principle of angular momentum. The drive system has a calculation unit, wherein the calculation unit is configured to receive the measurement signals and, by means of a Kalman filter implemented on the calculation unit, calculate in real time a respective estimated value of a respective axle shaft torque assigned to the respective axle shaft of the drive system. Also, the drive system is configured, when the respective estimated value is exceeded, via a predefined load limit of the respective axle shaft, to reduce the respective drive moment of the respective drive machine in real time.

In an embodiment of the drive system according to the invention, the drive system also has a respective gear mechanism on a respective axle. The drive system is configured to provide in real time a respective gear ratio signal for a respective gear translation ratio of the respective gear mechanism, wherein in the physical model of the drive system, the respective drive machine inertia moment is connected to the respective spring-damper element of the respective axle shaft via a respective gear translation ratio, and wherein the movement equation system obtained for the torsional oscillator chain by means of the principle of angular momentum is provided for the respective gear translation ratio.

FIG. 1 shows an electrified all-wheel-drive system 100, with two axle shafts 121, 122, 123, 124 on each respective drive train for the front and rear axles of a vehicle, according to the prior art. The vehicle, travelling in the direction of arrow 101, has a front electrical machine 141 and a rear electrical machine 142, which drive a front axle and rear axle respectively in the front and rear drive trains via a front transmission 131 and rear transmission 132 respectively. The front axle has a front left (VL) axle shaft 121 with a left front wheel 111, and a front right (VR) axle shaft 122 with a right front wheel 112. The rear axle has a rear left (HL) axle shaft 123 with a left rear wheel 113, and a rear right (HR) axle shaft 124 with a right rear wheel 114.

Figure 2:
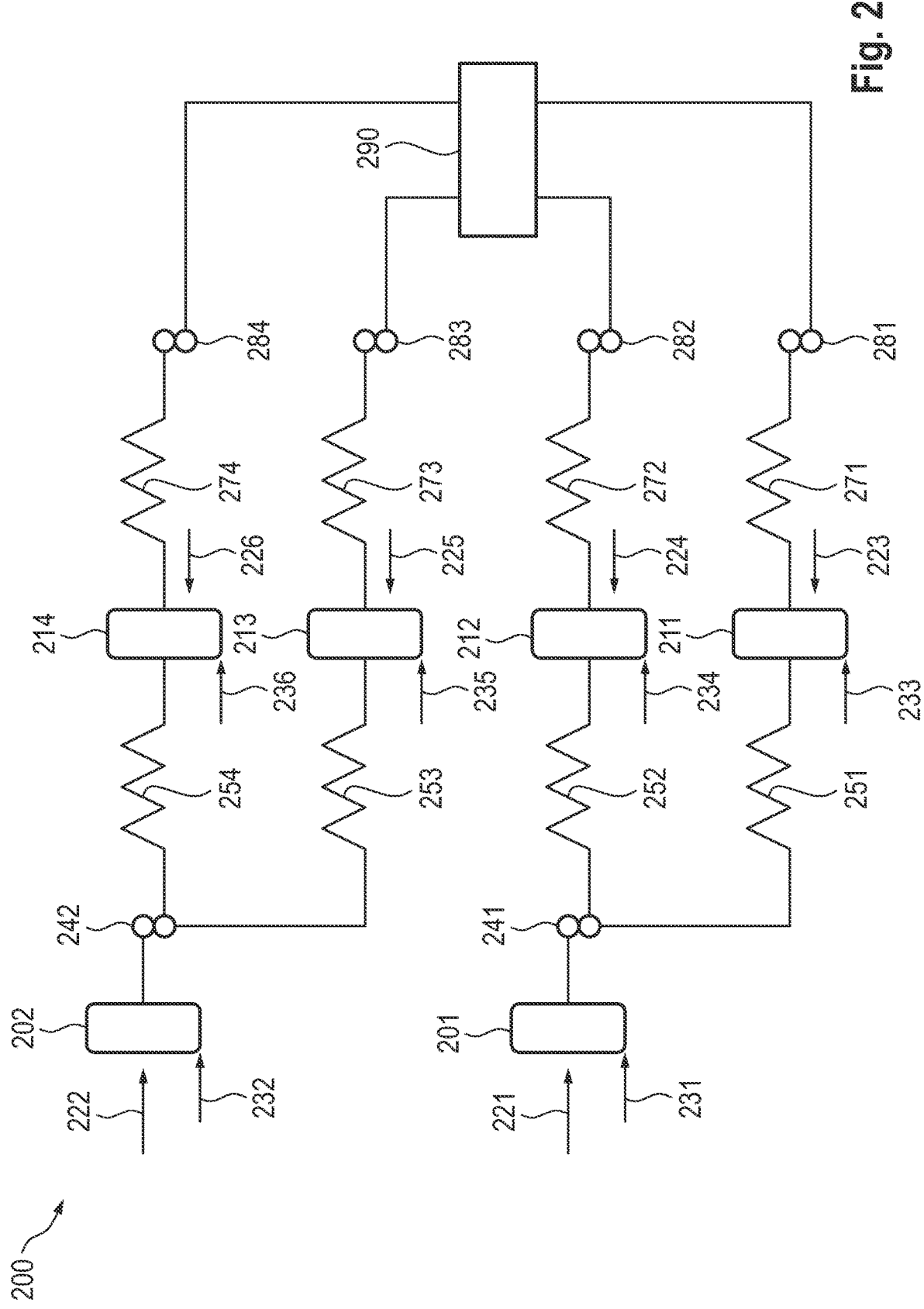
FIG. 2 shows a physical model of the all-wheel-drive system according to an embodiment of a method according to the present disclosure.

FIG. 2 shows a physical model 200 of the all-wheel-drive system from FIG. 1 according to an embodiment of the method according to the invention. The front electrical machine (EM) acting on a front axle (VA) with a drive moment $T_{EM,VA}$ 221 has an inertia moment $J_{EM,VA}$ 201 and rotates with an angular speed ωEM,VA 231. The rear electrical machine acting on a rear axle (HA) with a drive moment $T_{EM,HA}$ 222 has an inertia moment $J_{EM,HA}$ 202 and rotates with an angular speed $\omega_{EM,HA}$ 232. A respective gear mechanism is arranged in each drive train, wherein a gear ratio signal $i_{VA}$, $i_{HA}$ gives information on the respectively engaged gear. The respective axle shaft carrying the respective wheel with the respective inertia moment $J_{Rad,VL}$ 211, $J_{Rad,VR}$ 212, $J_{Rad,HL}$ 213, $J_{Rad,HR}$ 214 comprises a spring-damper element which is subjected to a respective axle shaft torque $T_{SW,VL}$ 251, $T_{SW,VR}$ 252, $T_{SW,HL}$ 253, $T_{SW,HR}$ 254. A respective braking moment $T_{B,VL}$ 223, $T_{B,VR}$ 224, $T_{B,HL}$ 225, $T_{B,HR}$ 226 acts on the respective wheel rotating with angular speed $\omega_{Rad,VL}$ 233, $\omega_{Rad,VR}$ 234, $\omega_{Rad,HL}$ 235, $\omega_{Rad,HR}$ 236. A coupling of the respective wheel to the vehicle 290, which is characterized by the parameters travel s, speed v and vehicle mass m, is described as a respective spring-damper element 271, 272, 273, 274, which connects the vehicle mass m via a respective tire radius $r_{VL}$ 281, $r_{VR}$ 282, $r_{HL}$ 283, $r_{HR}$ 284.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

100 Electrified all-wheel-drive system
101 Direction of travel
111 Left front wheel
112 Right front wheel
113 Left rear wheel
114 Right rear wheel
121 Axle shaft front left
122 Axle shaft front right
123 Axle shaft rear left
124 Axle shaft rear right
131 Front transmission
132 Rear transmission
141 Front electrical machine
142 Rear electrical machine
200 Physical model of drive system
201 Inertia moment $J_{EM,VA}$ front electrical machine
202 Inertia moment $J_{EM,HA}$ rear electrical machine
211 Inertia moment $J_{Rad,VL}$ front left wheel
212 Inertia moment $J_{Rad,VR}$ front right wheel
213 Inertia moment $J_{Rad,HL}$ rear left wheel
214 Inertia moment $J_{Rad,HR}$ rear right wheel
221 Drive moment $T_{EM,VA}$ front electrical machine
222 Drive moment $T_{EM,HA}$ rear electrical machine
223 Braking moment $T_{B,VL}$ front left wheel
224 Braking moment $T_{B,VR}$ front right wheel
225 Braking moment $T_{B,HL}$ rear left wheel
226 Braking moment $T_{B,HR}$ rear right wheel
231 Angular speed $\omega_{EM,VA}$ front electrical machine
232 Angular speed $\omega_{EM,HA}$ rear electrical machine
233 Angular speed $\omega_{Rad,VL}$ front left wheel
234 Angular speed $\omega_{Rad,VR}$ front right wheel
235 Angular speed $\omega_{Rad,HL}$ rear left wheel
236 Angular speed $\omega_{Rad,HR}$ rear right wheel
241 Gear ratio signal $i_{VA}$ front axle
242 Gear ratio signal $i_{HA}$ rear axle
251 Axle shaft torque $T_{SW,VL}$ front left spring-damper element
252 Axle shaft torque $T_{SW,VR}$ front right spring-damper element
253 Axle shaft torque $T_{SW,HL}$ rear left spring-damper element
254 Axle shaft torque $T_{SW,HR}$ rear right spring-damper element
271 Spring-damper element vehicle mass/left front wheel
272 Spring-damper element vehicle mass/right front wheel
273 Spring-damper element vehicle mass/left rear wheel
274 Spring-damper element vehicle mass/right rear wheel
281 Tire radius $r_{VL}$ front left wheel
282 Tire radius $r_{VR}$ front right wheel
283 Tire radius $r_{HL}$ rear left wheel
284 Tire radius $r_{HR}$ rear right wheel
290 Vehicle of mass m with travel s and speed v

The invention claimed is:

1. A method for estimating cardan shaft moments in a vehicle, the method comprising:
performing a state space modelling of a physical model for force transmission in at least one drive train, wherein the at least one drive train is formed with at least one drive machine, at least one axle and at least two axle shafts each with a respective wheel,
selecting the physical model as a torsional oscillator chain in which a respective drive machine inertia moment is assigned to the respective drive train and a respective wheel inertia moment is assigned to the respective wheel, wherein the respective drive machine inertia moment is connected by a respective spring-damper element to the respective wheel inertia moment of the respective wheel which is connected to the respective axle shaft, wherein a vehicle mass is connected by a respective spring-damper element via a respective tire radius to the respective wheel inertia moment of the respective wheel, wherein a movement equation system is provided for the torsional oscillator chain by means of the principle of angular momentum, providing, in real time, measurement signals of a respective drive moment of the respective drive machine, a respective angular speed of the respective drive machine, a respective braking moment at the respective wheel, and a respective angular speed of the respective wheel, estimating, in real time by a Kalman filter, a respective axle shaft torque assigned to the respective axle shaft, and reducing, in real time in response to a predefined load limit of the respective axle shaft torque being exceeded, the respective drive moment of the respective drive machine.

2. The method as claimed in claim 1, wherein a respective rotational degree of freedom is assigned to the respective drive machine inertia moment and the respective wheel inertia moments, and a longitudinal degree of freedom is assigned to the vehicle mass, wherein the respective rotational degree of freedom is described via a respective angle and/or a respective angular speed, and the longitudinal degree of freedom is described via a travel and/or a speed.

3. The method as claimed in claim 2, wherein a state vector is formed with the respective angle and respective angular speed of the respective drive machine, with the respective angle and respective angular speed of the respective wheel, with the travel and speed of the vehicle, wherein a system input vector is formed with the respective drive moment of the respective drive machine and the respective braking moment of the respective wheel, wherein the movement equations in vectorial form are transferred into a state space with a system matrix A which is filled with respective spring values and respective damping values of the respective spring-damper elements, an input matrix B which is filled with values of the respective drive machine inertia moment and the respective wheel inertia moment and the vehicle mass, and an output matrix C, which describe respective measurable states in the respective drive train, wherein the Kalman filter in a prediction step estimates a future system state, from this in a correction step a model prediction is calculated, from a difference between the model prediction and the measurement signal a model error is calculated, the model error is multiplied by a predefined steady-state Kalman amplification and added to the future system state, and wherein from such a corrected future system state, the estimation of the axle shaft torques is obtained.

4. The method as claimed in claim 1, wherein the respective drive machine inertia moment is connected via a respective gear translation ratio to the respective spring-damper element of the respective axle shaft, wherein a respective gear ratio signal for a respective gear translation ratio of the respective axle is provided in real time, and wherein the movement equation system obtained for the torsional oscillator chain via the principle of angular momentum is provided for the respective gear translation ratio.

5. The method as claimed in claim 1, wherein the method is applied to an axle with two axle shafts.

6. The method as claimed in claim 1, wherein the method is applied to an axle with four axle shafts.

7. The method as claimed in claim 1, wherein the method is applied to two axles each with two axle shafts.

8. The method as claimed in claim 1, wherein in addition to the measurement signals, a respective distribution variable of a respective controlled transverse differential lock is provided.

9. A drive system for estimating cardan shaft moments in a vehicle, the drive system comprising:

at least one drive train provided with respective measurement sensors, with at least one drive machine, at least one axle and at least two axle shafts each with a respective wheel and a respective brake, wherein the drive system is configured to provide in real time measurement signals of a respective drive moment of the respective drive machine, a respective angular speed of the respective drive machine, a respective braking moment at the respective wheel, and a respective angular speed of the respective wheel, wherein via the drive system a physical model is formed in which a respective drive machine inertia moment is assigned to the respective drive machine and a respective wheel inertia moment is assigned to a respective wheel, wherein the respective drive machine inertia moment is connected by a respective spring-damper element to the respective wheel inertia moment of the respective wheel which is connected to the respective axle shaft, wherein a vehicle mass is connected by a respective spring-damper element via a respective tire radius to the respective wheel inertia moment of the respective wheel, wherein the physical model is described by a torsional oscillator chain, wherein a movement equation system is produced for the torsional oscillator chain by means of the principle of angular momentum, wherein the drive system has a calculation unit, wherein the calculation unit is configured to receive the measurement signals and, via a Kalman filter implemented on the calculation unit, calculate in real time a respective estimated value of a respective axle shaft torque assigned to the respective axle shaft of the drive system, and wherein the drive system is configured, in response to the respective estimated value being exceeded, via a predefined load limit of the respective axle shaft, to reduce the respective drive moment of the respective drive machine in real time.

10. The drive system as claimed in claim 9, wherein the drive system further includes a respective gear mechanism on a respective axle, wherein the drive system is configured to provide in real time a respective gear ratio signal for a respective gear translation ratio of the respective gear mechanism, wherein in the physical model of the drive system, the respective drive machine inertia moment is connected via a respective gear translation ratio to the respective spring-damper element of the respective axle shaft, and wherein the movement equation system obtained for the torsional oscillator chain by means of the principle of angular momentum is provided for the respective gear translation ratio.

* * * * *